(12) United States Patent
Fang et al.

(10) Patent No.: US 10,805,849 B2
(45) Date of Patent: Oct. 13, 2020

(54) HANDOVER METHOD AND APPARATUS

(71) Applicant: ZTE Corporation, Shenzhen, Guangdong (CN)

(72) Inventors: Jianmin Fang, Guangdong (CN); Xiaojuan Shi, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 16/402,142

(22) Filed: May 2, 2019

(65) Prior Publication Data

US 2019/0261240 A1    Aug. 22, 2019

Related U.S. Application Data

(63) Continuation of application No. PCT/CN2017/109081, filed on Nov. 2, 2017.

(30) Foreign Application Priority Data

Nov. 2, 2016    (CN) .......................... 2016 1 0951190

(51) Int. Cl.
*H04W 36/08* (2009.01)
*H04W 36/00* (2009.01)
(Continued)

(52) U.S. Cl.
CPC ....... *H04W 36/08* (2013.01); *H04W 28/0268* (2013.01); *H04W 36/0044* (2013.01);
(Continued)

(58) Field of Classification Search
CPC .................................................. H04W 36/08
(Continued)

(56) References Cited

U.S. PATENT DOCUMENTS

2009/0201884 A1    8/2009   Chaponniere
2013/0308527 A1*   11/2013  Chin ................. H04W 36/0022
                                                          370/328
(Continued)

FOREIGN PATENT DOCUMENTS

CN        102291763 A       12/2011
CN        102316540 A       1/2012
(Continued)

OTHER PUBLICATIONS

International Search Report and Written Opinion dated Jan. 31, 2018 for International Application No. PCT/CN2017/109081, filed on Nov. 2, 2017 (8 pages).
(Continued)

*Primary Examiner* — Peter G Solinsky
(74) *Attorney, Agent, or Firm* — Perkins Coie LLP

(57) ABSTRACT

A handover method includes: transmitting a handover request message by a source base station to a target base station when a user equipment (UE) is being handed over from the source base station to the target base station, where the handover request message carries one or more DRB information items configured by the source base station for the UE and one or more flow QoS information items configured by a core network side for the UE; receiving, by the source base station, a handover request acknowledgement message transmitted by the target base station, where the handover request acknowledgement message carries first DRB configuration information generated by the target base station for the UE; and transmitting an RRC connection reconfiguration message carrying the first DRB configuration information by the source base station to the UE. Also disclosed is a handover apparatus.

20 Claims, 8 Drawing Sheets

(51) Int. Cl.
*H04W 68/00* (2009.01)
*H04W 76/27* (2018.01)
*H04W 80/08* (2009.01)
*H04W 80/02* (2009.01)
*H04W 28/02* (2009.01)

(52) U.S. Cl.
CPC ......... *H04W 68/005* (2013.01); *H04W 76/27* (2018.02); *H04W 80/02* (2013.01); *H04W 80/08* (2013.01)

(58) Field of Classification Search
USPC .......................................................... 370/331
See application file for complete search history.

(56) References Cited

U.S. PATENT DOCUMENTS

| | | | |
|---|---|---|---|
| 2015/0078286 A1* | 3/2015 | Kim .......................... | H04L 1/18 370/329 |
| 2015/0358864 A1 | 12/2015 | Park et al. | |
| 2016/0373975 A1* | 12/2016 | Xu ..................... | H04W 36/0055 |
| 2017/0013453 A1* | 1/2017 | Lee ....................... | H04W 12/04 |
| 2017/0359749 A1* | 12/2017 | Dao .................. | H04W 28/0268 |
| 2018/0049218 A1* | 2/2018 | Hapsari ................. | H04W 76/11 |
| 2018/0098241 A1* | 4/2018 | Callard ................. | H04W 92/10 |
| 2018/0146398 A1* | 5/2018 | Kim .................. | H04W 72/0406 |
| 2019/0058997 A1* | 2/2019 | Futaki ................... | H04W 76/27 |
| 2019/0182737 A1* | 6/2019 | Futaki ................... | H04W 36/14 |
| 2019/0191348 A1* | 6/2019 | Futaki ................... | H04W 36/12 |
| 2019/0199532 A1* | 6/2019 | Zhang ................... | H04L 9/3242 |
| 2019/0223152 A1* | 7/2019 | Ke ......................... | H04W 68/00 |
| 2019/0261246 A1* | 8/2019 | Zhu ....................... | H04W 40/12 |
| 2019/0320476 A1* | 10/2019 | Wang ................ | H04W 28/0268 |

FOREIGN PATENT DOCUMENTS

| | | |
|---|---|---|
| CN | 103916917 A | 7/2014 |
| CN | 105228263 A | 1/2016 |
| EP | 3 477 991 A1 | 5/2019 |
| EP | 3 499 964 A1 | 6/2019 |
| WO | 2015/115761 A1 | 8/2015 |
| WO | 2018/082817 A1 | 5/2018 |

OTHER PUBLICATIONS

Ericsson, "Lossless inter-RAT handover with 5GC", 3GPP TSG-RAN WG2 #97, R2-1700877, Athens, Greece, Feb. 2017 (4 pages).
Extended European Search Report dated Oct. 17, 2019 for European Patent Application No. 17868268.8, filed Nov. 2, 2017 (17 pages).
Huawei, "Data Forwarding for QoS Flow Remapping During Mobility", 3GPP TSG-RAN WG3 #96, R3-171810, Hangzhou, P.R. China, May 2017 (4 pages).
Huawei, "Flow based QoS during Handover", 3GPP TSG-RAN WG3 NR Ad-hoc, R3-170253, Spokane, Washington, USA, Jan. 2017 (4 pages).
Huawei, et al., "QoS Flow to DRB Mapping", 3GPP TSG-RAN2 Meeting #97, R2-1701205, Athens, Greece, Feb. 2017 (6 pages).

* cited by examiner

HANDOVER METHOD AND APPARATUS

CROSS REFERENCE TO RELATED APPLICATIONS

This patent document is a continuation of and claims priority to International Patent Application No. PCT/CN2017/109081, filed on Nov. 2, 2017, which claims the benefit of priority of Chinese Patent Application No. 201610951190.4, filed on Nov. 2, 2016. The entire contents of the before-mentioned patent applications are incorporated by reference as part of the disclosure of this application.

TECHNICAL FIELD

The present disclosure relates to the communications field and, in particular, to a handover method and apparatus.

BACKGROUND

FIG. 1 is a structural diagram of a 4G system. In the 4th Generation (4G) or the Long Term Evolution (LTE) mobile communication system, data flows with the same Quality of Service (QoS) requirement are aggregated into a bearer. An access network (AN) and a core network (CN) process the QoS according to the bearer. In the 4G system, the access network includes an evolved Node B (eNB) and a user equipment (UE). If one network side bearer on an S1 interface between the eNB and the core network exists, one radio bearer on an air interface between the eNB and the UE correspondingly exists. That is, the network side bearer and the radio bearer are in one-to-one correspondence.

In the 4G system, a QoS parameter includes: a QoS class identifier (QCI) and an allocation and retention priority (ARP). The QCI includes a bearer type (a guaranteed bit rate (GBR) or a non-GBR), a priority, a packet delay budget and a packet error Rate. The APR is configured to indicate a priority of the bearer corresponding to deleting or retaining when an overload occurs.

If the bearer type is a non-GBR bearer, the QoS parameter further includes: an aggregate maximum bit rate (AMBR). The AMBR includes: aggregate maximum bit rates of all non-GBR bearers of the UE (UE-AMBR) and an aggregate maximum bit rate of a non-GBR bearer corresponding to an access point name (APN) (APN-AMBR).

If the bearer type is a GBR bearer, the QoS parameter further includes: a maximum bit rate (MBR) and a GBR.

In the 4G system, since a QoS policy is controlled by the core network and the base station passively accepts or rejects the QoS parameter, the base station cannot adjust the QoS parameter according to a real-time wireless load and the core network cannot learn the current wireless load in real time. Therefore, it is difficult for the core network to make a reasonable QoS decision. A policy and charging rule function (PCRF) in the core network ensures that the UE does not have two bearers of the same QoS in a packet data network (PDN) link. After the UE requested a first PDN link, if the UE requests a second PDN link, a bearer having the same QoS as that in the first PDN link may be established due to different PCRF decisions, and a UE may have two network side bearers of the same QoS. Since the radio bearer and the network side bearer are in one-to-one correspondence, multiple radio bearers exist, causing the waste of the radio resources.

FIG. 2 is a structural diagram of a 5th Generation (5G) system using the 5G mobile communication technology. Compared with the 4G mobile communication system, the 5G mobile communication system may have an improving demand for 1000 times network throughput capacity, 100 times device connections and one tenth lower latency. To a certain extent, the 5G system requires a new and better QoS mechanism.

The 5G system may adopt a unified structure to support an enhanced mobile broadband (eMBB), massive machine type communication (mMTC), ultra reliable and low latency communication (URLLC) and other services. In the 5G system, the core network, the base station and the UE may be greatly evolved. A base station for the transition from the 4G mobile communication technology to the 5G mobile communication technology may exist. An air interface of this type of base station is similar to an air interface of the base station (i.e., eNB) in the 4G system, and this type of base station may be successfully connected to a 5G core network via its air interface. This type of base station may be referred to as an evolved eNB. Similar to an X2 interface between eNBs in the 4G system, a direct interface may also exist between 5G base stations in the 5G system, which is referred to as an Xn interface. The Xn interface may also exist between evolved eNBs or between the evolved eNB and the 5G base station. Similar to an S1 interface between the eNB and the core network in the 4G system, an interface between the 5G base station and the 5G core network in the 5G system is referred to as an NG interface. The NG interface may also exist between the evolved eNB and the 5G core network.

The evolved eNB may also be successfully connected to the 5G core network, but since the evolved eNB is similar to the base station (eNB) in the 4G system on the aspect of the air interface, a radio resource control (RRC) protocol of the evolved eNB is similar to the RRC of the eNB, which is significantly different from the RRC of the 5G base station. Therefore, the evolved eNB and the 5G base station may not be able to identify each other's RRC protocol.

SUMMARY

A handover method and apparatus provided by the present disclosure may solve the problem that the QoS mechanism adopted by a core network and the QoS mechanism adopted by an access network are different when the base station is being handed over.

A handover method includes:

transmitting a handover request message by a source base station to a target base station when a user equipment (UE) is being handed over from the source base station to the target base station, where the handover request message carries one or more DRB information items configured by the source base station for the UE and one or more flow QoS information items configured by a core network side for the UE;

receiving, by the source base station, a handover request acknowledgement message transmitted by the target base station, where the handover request acknowledgement message carries first DRB configuration information generated by the target base station for the UE according to the handover request message; and transmitting a radio resource control (RRC) connection reconfiguration message carrying the first DRB configuration information by the source base station to the UE, where the first DRB configuration information is used for configuring radio resources by the UE.

In an exemplary embodiment, the flow QoS information item includes: identifier information for indicating the flow quality of service information item and a quality of service (Qos) rule. The identifier information includes a flow identifier or a quality of service identifier (QoS ID).

In an exemplary embodiment, the QoS rule includes at least one of the following: a packet delay budget (PDB), a packet error rate (PER), a priority, a guaranteed flow bit rate, a maximum flow bit rate, an allocation and retention priority, a per UE maximum bit rate, admission control, a flow priority level (FPL), a packet priority instruction (PPI), a packet discard priority indicator (PDPI), a quality of experience (QoE) level, and a reflective QoS indication.

In an exemplary embodiment, each DRB information item includes: a DRB identifier (DRB ID); and the each DRB information item further includes: the flow ID associated with the DRB corresponding to the DRB ID or the QoS ID associated with the DRB corresponding to the DRB ID, and second DRB configuration information configured by the source base station for the DRB. The second DRB configuration information includes a packet data convergence protocol (PDCP), a radio link control (RLC) and a configuration parameter of a logical channel, which are configured by the source base station for the DRB.

In an exemplary embodiment, when the first DRB configuration information received by the source base station includes a flow ID or QoS ID that is not associated with any DRB in the one or more DRB information items, after the source base station transmits the RRC connection reconfiguration message to the UE, the method further includes:

transmitting the flow ID or QoS ID that is not associated with any DRB in the one or more DRB information items by the source base station to a core network.

A handover method includes:

receiving, by a target base station, a handover request message transmitted by a source base station when a user equipment (UE) is being handed over from the source base station to the target base station, where the handover request message carries one or more DRB information items configured by the source base station for the UE and one or more flow QoS information items configured by a core network side for the UE;

generating first DRB configuration information by the target base station for the UE according to the handover request message; and transmitting a handover request acknowledgement message carrying the first DRB configuration information by the target base station to the source base station.

In an exemplary embodiment, the generating first DRB configuration information by the target base station for the UE according to the handover request message includes:

putting, by the target base station, DRB configuration information corresponding to a first DRB in the one or more DRB information items which the target base station agrees to establish into a DRB addition modification list, and putting a DRB identifier corresponding to a second DRB in the one or more DRB information items which the target base station does not agree to establish into a DRB release list; and determining, by the target base station, the DRB addition modification list and the DRB release list to be the first DRB configuration information.

In an exemplary embodiment, each DRB configuration information in the DRB addition modification list includes a first DRB ID and one or more of the following: one or more flow IDs or quality of service identifiers (QoS IDs) associated with a first DRB corresponding to the first DRB ID, packet data convergence protocol (PDCP) configuration information, radio link control (RLC) configuration information and logical channel configuration information.

In an exemplary embodiment, the one or more flow IDs or QoS IDs associated with the first DRB corresponding to the first DRB ID includes: one or more flow IDs or QoS IDs with which the first DRB is re-associated after the target base station changes an association relationship between the first DRB and the one or more flow IDs or QoS IDs.

In an exemplary embodiment, when the first DRB configuration information includes a flow ID or QoS ID that is not associated with any DRB in the one or more DRB information items, after the UE successfully accesses to the target base station, the method further includes:

transmitting the flow ID or QoS ID that is not associated with any DRB in the one or more DRB information items by the target base station to a core network.

A handover method includes:

receiving, by a user equipment (UE), a radio resource control (RRC) connection reconfiguration message carrying DRB configuration information transmitted by a source base station when the UE is being handed over from the source base station to the target base station, where the DRB configuration information is generated by the target base station for the UE according to a handover request message, and the handover request message is transmitted by the source base station to the target base station and carries one or more DRB information items configured by the source base station for the UE and one or more flow QoS information items configured by a core network side for the UE; and configuring, by the UE, radio resources according to the DRB configuration information in the RRC connection reconfiguration message.

In an exemplary embodiment, the DRB configuration information includes: a DRB addition modification list and a DRB release list.

Each tuple in the DRB addition modification list comprises a first DRB identifier and one or more of: one or more flow IDs or quality of service identifiers (QoS IDs) associated with a first DRB corresponding to the first DRB identifier, packet data convergence protocol (PDCP) configuration information, radio link control (RLC) configuration information and logical channel configuration information, where the first DRB is a DRB in the one or more DRB information items which the target base station agrees to establish.

Each tuple in the DRB release list comprises a second DRB ID, where a second DRB corresponding to the second DRB ID is a DRB in the one or more DRB information items which the target base station does not agree to establish.

In an exemplary embodiment, the configuring, by the UE, radio resources according to the DRB configuration information in the RRC connection reconfiguration message includes:

configuring, by the UE, radio resources for the first DRB according to each tuple information in the DRB addition modification list; and releasing radio resources of the second DRB corresponding to the second DRB ID according to the second DRB ID in each tuple information in the DRB release list.

In an exemplary embodiment, the configuring radio resources on the first DRB includes one or more of the following:

reestablishing PDCP;

reestablishing RLC;

reconfiguring the PDCP according to the PDCP configuration information;

reconfiguring the RLC according to the RLC configuration information;

reconfiguring a logical channel according to the logical channel configuration information; and reconfiguring an association relationship between the first DRB and the flow ID or QoS ID according to the flow ID or QoS ID associated with the first DRB.

A handover apparatus, which is applied to a source base station, includes: a first transmission module, a reception module and a second transmission module.

The first transmission module is configured to transmit a handover request message to a target base station when a user equipment (UE) is being handed over from the source base station to the target base station. The handover request message carries one or more DRB information items configured by the source base station for the UE and one or more flow QoS information items configured by a core network side for the UE.

The reception module is configured to receive a handover request acknowledgement message transmitted by the target base station. The handover request acknowledgement message carries first DRB configuration information generated by the target base station for the UE according to the handover request message.

The second transmission module is configured to transmit a radio resource control (RRC) connection reconfiguration message carrying the first DRB configuration information to the UE. The first DRB configuration information is used for configuring radio resources by the UE.

In an exemplary embodiment, the flow quality of service information item includes: identifier information for indicating the flow quality of service information item and a quality of service rule, where the identifier information includes a flow identifier or a quality of service identifier (QoS ID).

A handover apparatus, which is applied to a target base station, includes: a reception module, a generation module and a transmission module.

The reception module is configured to receive a handover request message transmitted by a source base station when a UE is being handed over from the source base station to the target base station. The handover request message carries one or more DRB information items configured by the source base station for the UE and one or more flow QoS information items configured by a core network side for the UE.

The generation module is configured to generate first DRB configuration information for the UE according to the handover request message.

The transmission module is configured to transmit a handover request acknowledgement message carrying the first DRB configuration information to the source base station.

In an exemplary embodiment, the generation module includes: a configuration unit and a determination unit.

The configuration unit is configured to put DRB configuration information corresponding to a first DRB in the one or more DRB information items which the target base station agrees to establish into a DRB addition modification list, and put a DRB identifier corresponding to a second DRB in the one or more DRB information items which the target base station does not agree to establish into a DRB release list.

The determination unit is configured to determine the DRB addition modification list and the DRB release list to be the first DRB configuration information.

A handover apparatus, which is applied to a user equipment (UE), includes: a reception module and a configuration module.

The reception module is configured to receive a radio resource control (RRC) connection reconfiguration message carrying DRB configuration information transmitted by a source base station when the UE is being handed over from the source base station to a target base station. The DRB configuration information is generated by the target base station for the UE according to a handover request message. The handover request message is transmitted by the source base station to the target base station and carries one or more DRB information items configured by the source base station for the UE and one or more flow QoS information items configured by a core network side for the UE.

The configuration module is configured to configure radio resources according to the DRB configuration information in the RRC connection reconfiguration message.

In an exemplary embodiment, the DRB configuration information includes: a DRB addition modification list and a DRB release list.

Each tuple in the DRB addition modification includes a first DRB identifier and one or more of: one or more flow IDs or quality of service identifiers (QoS IDs) associated with a first DRB corresponding to the first DRB identifier, packet data convergence protocol (PDCP) configuration information, radio link control (RLC) configuration information and logical channel configuration information, where the first DRB is a DRB in the one or more DRB information items which the target base station agrees to establish.

Each tuple in the DRB release list includes a second DRB ID, wherein a second DRB corresponding to the second DRB ID is a DRB in the one or more DRB information items which the target base station does not agree to establish.

A computer-readable storage medium stores computer-executable instructions for executing any method described above. A source base station includes:

at least one processor; and a memory which is communicatively connected to the at least one processor.

The memory stores instructions which may be executed by the at least one processor, and the at least one processor executes the instructions to execute the above method executed by the source base station.

A target base station includes:

at least one processor; and a memory which is communicatively connected to the at least one processor.

The memory stores instructions which may be executed by the at least one processor, and the at least one processor executes the instructions to execute the above method executed by the target base station.

A user equipment includes:

at least one processor; and a memory which is communicatively connected to the at least one processor.

The memory stores instructions which may be executed by the at least one processor, and the at least one processor executes the instructions to execute the above method executed by the user equipment.

DETAILED DESCRIPTION

Figure 1:
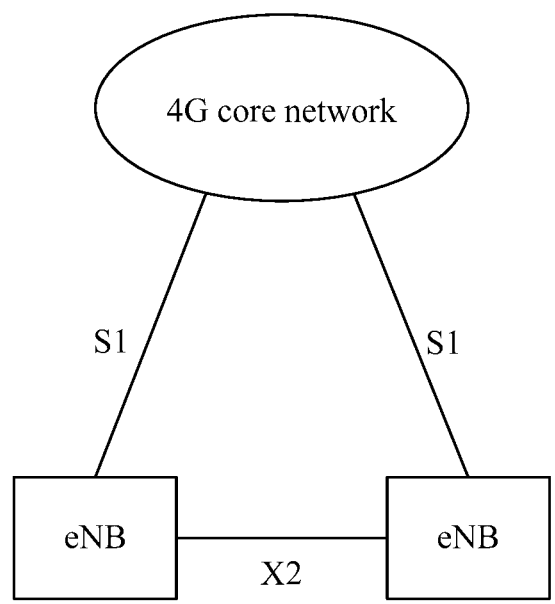
FIG. 1 is a structural diagram of a 4G system.
Figure 2:
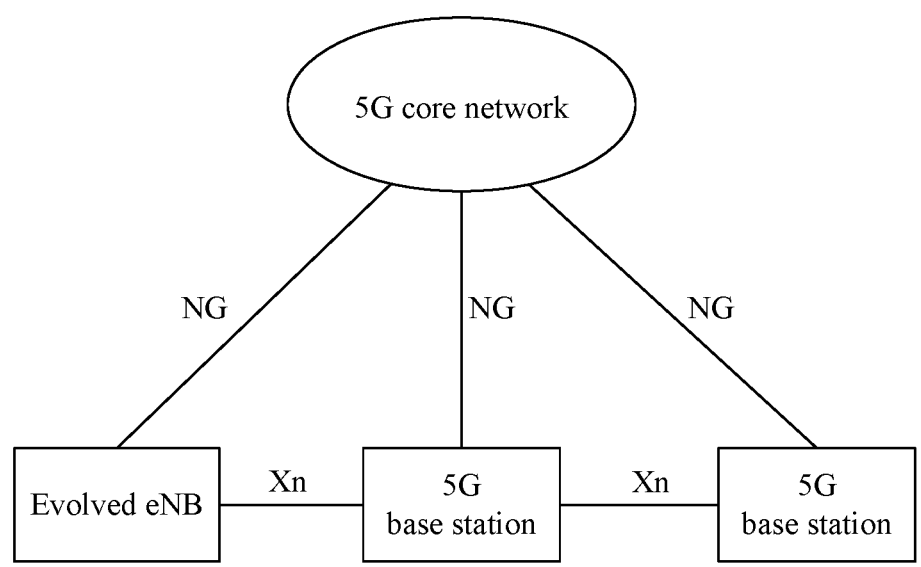
FIG. 2 is a structural diagram of a 5G system.
Figure 3:
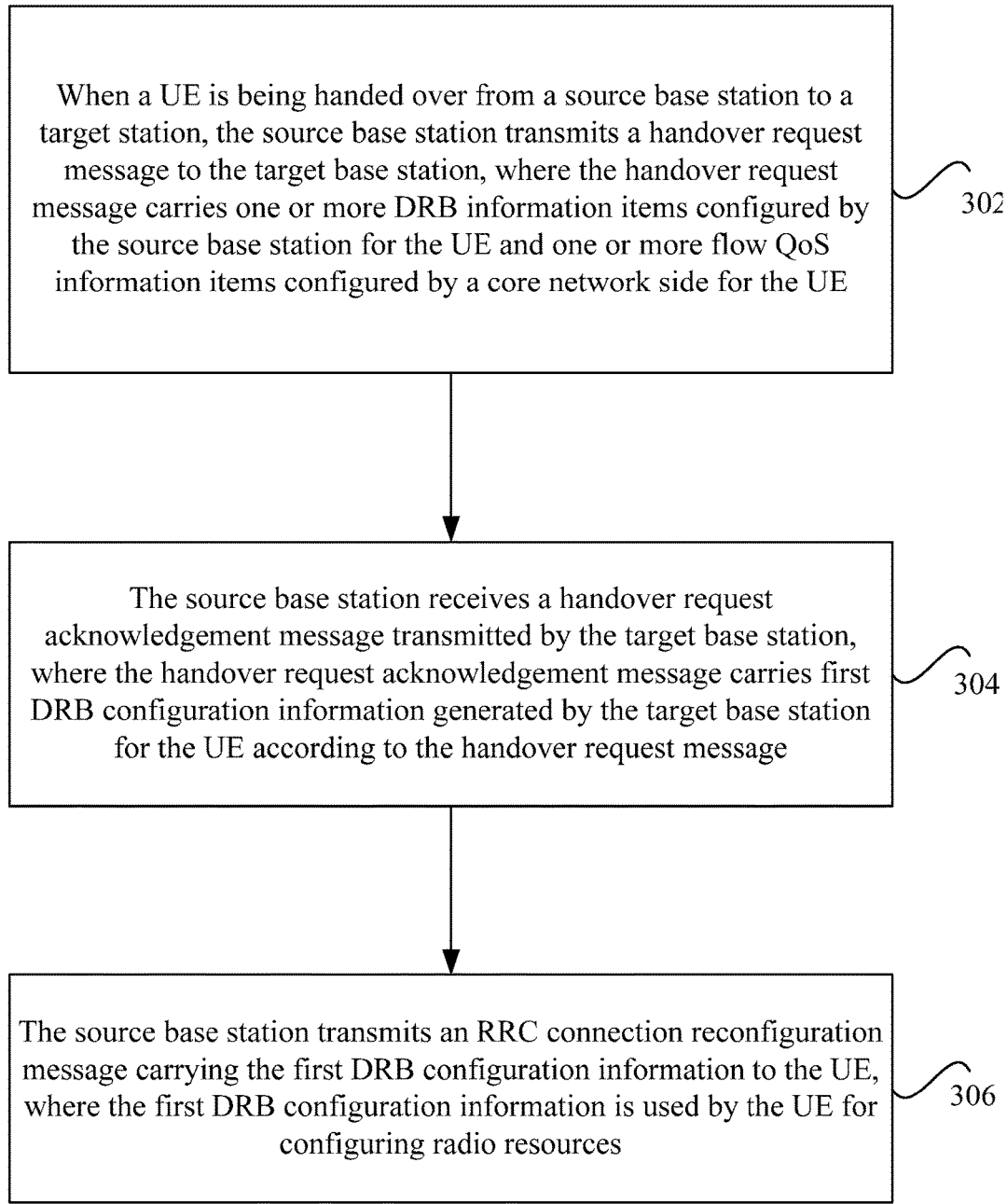
FIG. 3 is a flowchart of a handover method according to an embodiment of the present disclosure.

The terms "first", "second" and the like in the description, claims and drawings of the present disclosure are used to distinguish between similar objects and are not necessarily used to describe a particular order or sequence. FIG. 3 is a flowchart of a handover method according to an embodiment of the present disclosure. The method provided by this embodiment may be used in the network structure shown in FIG. 1 or FIG. 2 described above. The execution party of the method in this embodiment may be a base station, for example, a source base station. As shown in FIG. 3, the method includes the steps described below.

In step 302, a source base station transmits a handover request message to a target base station when a user equipment (UE) is being handed over from the source base station to the target base station, where the handover request message carries one or more data radio bearer (DRB) information items configured by the source base station for the UE and one or more flow quality of service (Qos) information items configured by a core network side for the UE.

In step 304, the source base station receives a handover request acknowledgement message transmitted by the target base station. The handover request acknowledgement message carries first DRB configuration information generated by the target base station for the UE according to the handover request message.

In step 306, the source base station transmits a radio resource control (RRC) connection reconfiguration message carrying the first DRB configuration information to the UE, where the first DRB configuration information is used for being configured radio resources by the UE.

The method described above may solve the problem that the QoS mechanism adopted by a core network and the QoS mechanism adopted by an access network are not unified in the base station handover. When the core network and the access network adopt different QoS mechanisms and an evolved eNB and a 5G base station cannot identify each other's RRC protocol, the method described above may implement the handover on an Xn interface between the evolved eNB and the 5G base station which can ensure the QoS (e.g., no data packet is lost and no data packet is repeatedly transmitted).

Optionally, the flow QoS information item includes: identifier information for indicating the flow QoS information item and a QoS rule, where the identifier information includes a flow identifier or a QoS ID.

In an embodiment, the QoS rule includes at least one of the following: a packet delay budget (PDB), a packet error rate (PER), a priority, a guaranteed flow bit rate, a maximum flow bit rate, an allocation and retention priority (ARP), a per UE maximum bit rate, admission control, a flow priority level (FPL), a packet priority instruction (PPI), a packet discard priority indicator (PDPI), a quality of experience (QoE) level (QoS Level), and a reflective QoS indication.

The reflective QoS indication is used for indicating that uplink flow QoS information is determined according to downlink flow QoS information. When the QoS rule includes the reflective QoS indication, the QoS rule may not include the uplink flow QoS information.

In an exemplary embodiment, each DRB information item includes: a DRB ID. The DRB information item further includes: the flow ID associated with a DRB corresponding to the DRB ID or the QoS ID associated with the DRB corresponding to the DRB ID, and second DRB configuration information configured by the source base station for the DRB. The second DRB configuration information includes: a packet data convergence protocol (PDCP), radio link control (RLC) and a configuration parameter of a logical channel, which are configured by the source base station for the DRB.

In an exemplary embodiment, if the first DRB configuration information received by the source base station includes a flow ID or QoS ID that is not associated with any of all DRBs corresponding to all DRBs in all DRB information items, after the source base station transmits the RRC connection reconfiguration message to the UE, the method further includes: transmitting the flow ID or QoS ID that is not associated with any of all DRBs corresponding to all DRBs in all DRB information items by the source base station to a core network.

Figure 4:
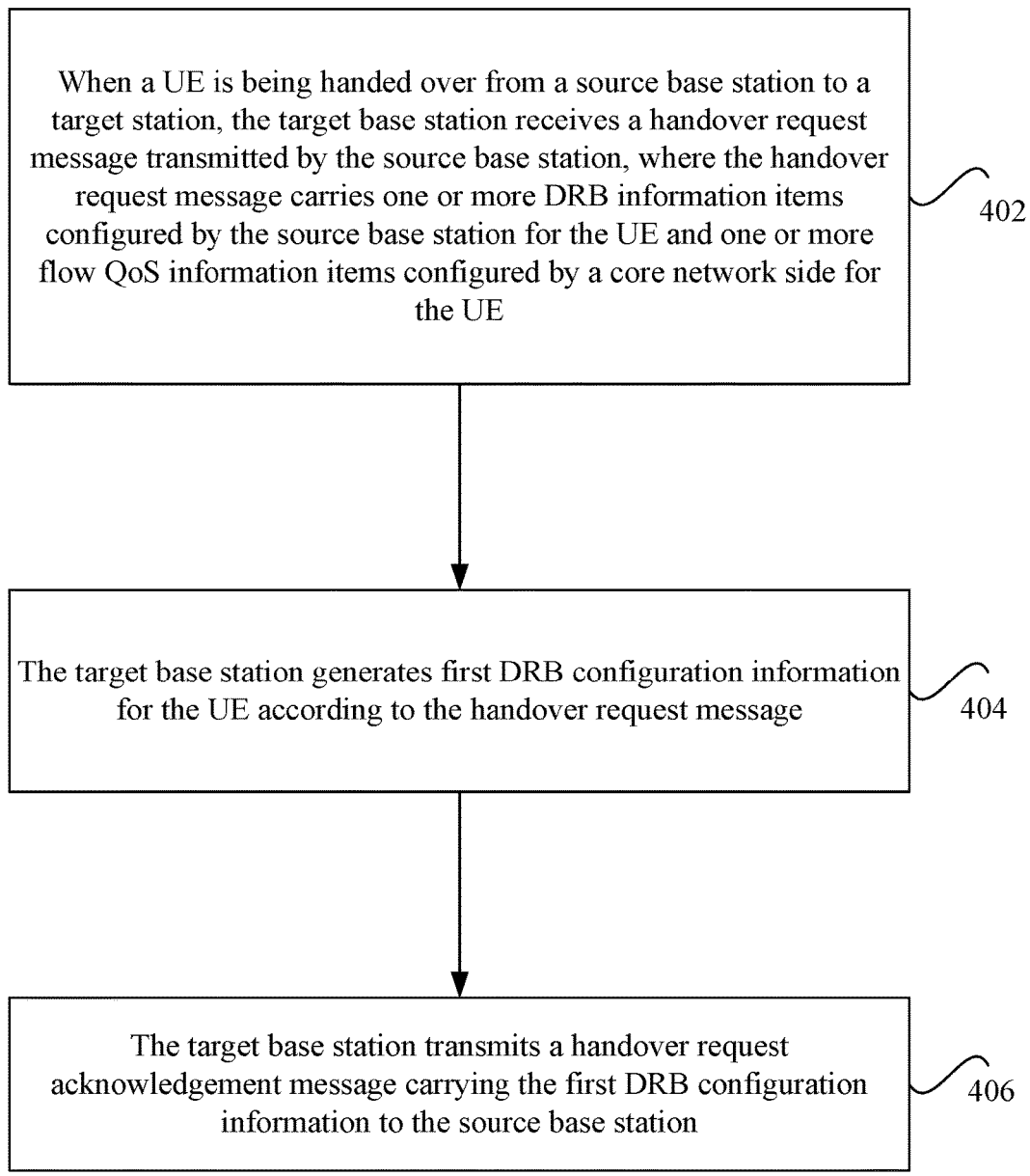
FIG. 4 is a flowchart of another handover method according to an embodiment of the present disclosure.

FIG. 4 is a flowchart of a handover method according to an embodiment of the present disclosure. As shown in FIG. 4, the method includes steps described below.

In step 402, when a user equipment (UE) is being handed over from a source base station to a target base station, the target base station receives a handover request message transmitted by the source base station. The handover request message carries one or more DRB information items configured by the source base station for the UE and one or more flow QoS information items configured by a core network side for the UE.

In step 404, the target base station generates first DRB configuration information for the UE according to the handover request message.

In step 406, the target base station transmits a handover request acknowledgement message carrying the first DRB configuration information to the source base station.

In an exemplary embodiment, the process of generating first DRB configuration information by the target base station for the UE according to the handover request message includes:

putting, by the target base station, DRB configuration information corresponding to a first DRB in the DRB information items which the target base station agrees to establish into a DRB addition modification list, and putting a DRB ID corresponding to a second DRB in the DRB information items which the target base station does not agree to establish into a DRB release list; and determining, by the target base station, the DRB addition modification list and the DRB release list to be the first DRB configuration information.

In an exemplary embodiment, each DRB configuration information in the DRB addition modification list includes a first DRB ID and one or more of the following: one or more flow IDs or QoS IDs associated with a DRB corresponding to the first DRB ID, packet data convergence protocol (PDCP) configuration information, radio link control (RLC) configuration information and logical channel configuration information.

In an exemplary embodiment, the one or more flow IDs or QoS IDs associated with a first DRB corresponding to the first DRB ID includes: one or more flow IDs or QoS IDs with which the first DRB corresponding to the first DRB ID is re-associated after the target base station changes an association relationship between the first DRB and the one or more flow IDs or QoS IDs.

In an optional embodiment, if the DRB configuration information includes a flow ID or QoS ID that is not associated with any DRB in all DRB information items, after the UE successfully accesses to the target base station, the method further includes: transmitting the flow ID or QoS ID that is not associated with any DRB in all DRB information items by the source base station to a core network.

Figure 5:
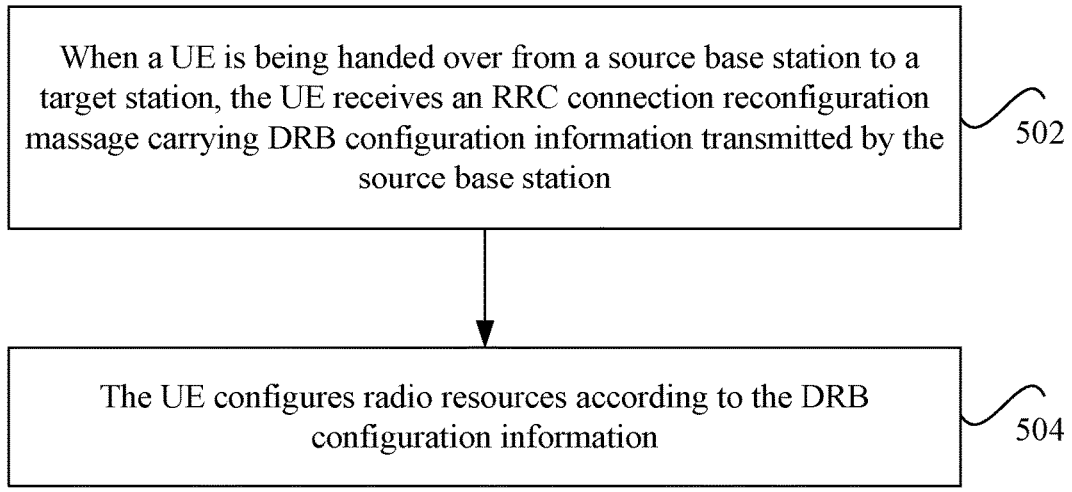
FIG. 5 is a flowchart of yet another handover method according to an embodiment of the present disclosure.

FIG. 5 is a flowchart of a handover method according to an embodiment of the present disclosure. As shown in FIG. 5, the method includes steps described below.

In step 502, when a user equipment (UE) is being handed over from a source base station to a target base station, the UE receives a radio resource control (RRC) connection reconfiguration message carrying DRB configuration information transmitted by the source base station. The DRB configuration information is generated by the target base station for the UE according to a handover request message, and the handover request message is transmitted by the source base station to the target base station and carries one or more DRB information items configured by the source base station for the UE and one or more flow QoS information items configured by a core network side for the UE.

In step 504, the UE configures radio resources according to the DRB configuration information in the RRC connection reconfiguration message.

In an exemplary embodiment, the DRB configuration information includes: a DRB addition modification list and a DRB release list. Each tuple in the DRB addition modification list includes a first DRB ID and one or more of the following: one or more flow IDs or QoS IDs associated with a first DRB corresponding to the first DRB ID, PDCP configuration information, RLC configuration information and logical channel configuration information. The first DRB is a DRB in the DRB information items which the target base station agrees to establish. Each tuple in the DRB release list includes a second DRB ID, and the second DRB corresponding to the second DRB ID is a DRB in the DRB information items which the target base station does not agree to establish.

In an exemplary embodiment, the process of the UE configuring radio resources according to the DRB configuration information in the RRC connection reconfiguration message includes: configuring, by the UE, radio resources for the first DRB according to each tuple information in the DRB addition modification list, and releasing radio resources of the second DRB corresponding to the second DRB ID according to the second DRB ID in the each tuple information in the DRB release list.

In an exemplary embodiment, the configuring radio resources for the first DRB includes one or more of the following:
reestablishing PDCP;
reestablishing RLC;
reconfiguring the PDCP according to the PDCP configuration information;
reconfiguring the RLC according to the RLC configuration information;
reconfiguring a logical channel according to the logical channel configuration information; and
reconfiguring an association relationship between the first DRB and the flow ID or QoS ID according to the flow ID or QoS ID associated with the first DRB.

The method in embodiments described above may be implemented by software plus a general-purpose hardware platform, or may be implemented by hardware. The solution provided by the present disclosure may be embodied in the form of a software product. The computer software product is stored in a non-transient storage medium (such as a read-only memory (ROM), a random-access memory (RAM), a magnetic disk or an optical disk) and the computer software product includes one or more instructions for enabling a terminal device (which may be a mobile phone, a computer, a server, a network device or the like) to execute the method described in the embodiments of the present disclosure. The computer software product may be stored in a transient storage medium.

The following embodiments of the present disclosure provide handover apparatuses for implementing the embodiments described above. A term "module" may be at least one of software and hardware capable of implementing preset functions.

Figure 6:
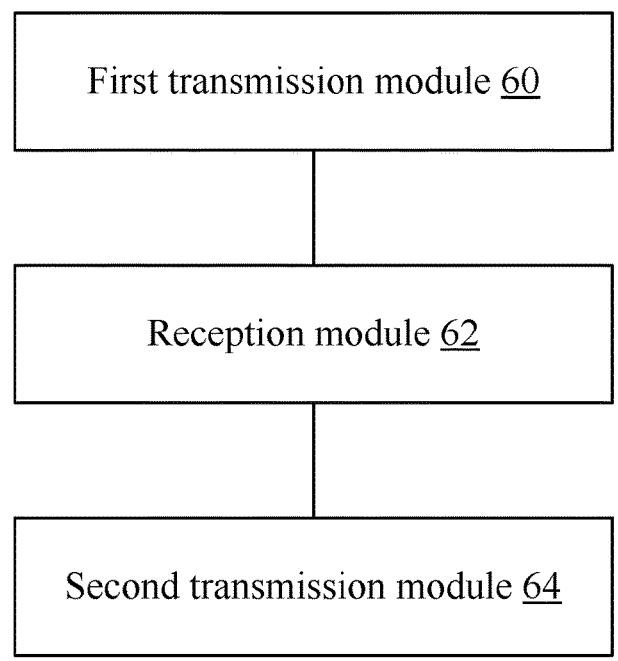
FIG. 6 is a block diagram of a handover apparatus according to an embodiment of the present disclosure.

FIG. 6 is a block diagram of a handover apparatus according to an embodiment of the present disclosure. The apparatus may be applied in a source base station. As shown in FIG. 6, the apparatus includes: a first transmission module 60, a reception module 62 and a second transmission module 64.

The first transmission module 60 is configured to transmit a handover request message to a target base station when a user equipment (UE) is being handed over from the source base station to the target base station. The handover request message carries one or more DRB information items configured by the source base station for the UE and one or more flow QoS information items configured by a core network side for the UE.

The reception module 62 is configured to receive a handover request acknowledgement message transmitted by the target base station. The handover request acknowledgement message carries first DRB configuration information generated by the target base station for the UE according to the handover request message.

The second transmission module 64 is configured to transmit a radio resource control (RRC) connection reconfiguration message carrying the first DRB configuration information to the UE, where the first DRB configuration information is used by the UE for configuring radio resources.

In an exemplary embodiment, the flow quality of service information includes: identifier information for indicating the flow quality of service information and a quality of service rule, where the identifier information includes a flow identifier or a QoS ID.

Figure 7:
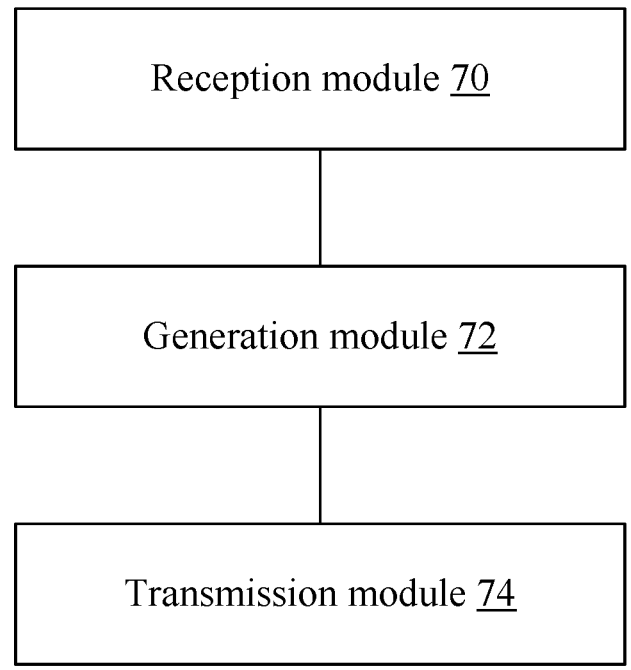
FIG. 7 is a block diagram of another handover apparatus according to an embodiment of the present disclosure.

FIG. 7 is a block diagram of a handover apparatus according to an embodiment of the present disclosure. The apparatus may be applied in a target base station. As shown in FIG. 7, the apparatus includes: a reception module 70, a generation module 72 and a transmission module 74.

The reception module 70 is configured to receive a handover request message sent by the target base station when a user equipment (UE) is being handed over from a source base station to the target base station. The handover request message carries one or more DRB information items configured by the source base station for the UE and one or more flow QoS information items configured by a core network side for the UE.

The generation module 72 is configured to generate first DRB configuration information for the UE according to the handover request message.

The transmission module 74 is configured to transmit a handover request acknowledgement message carrying the first DRB configuration information to the source base station.

In an exemplary embodiment, the generation module 72 includes: a configuration unit and a determination unit. The configuration unit is configured to put DRB configuration information corresponding to a first DRB in the DRB information items which the target base station agrees to establish into a DRB addition modification list, and put a DRB identifier corresponding to a second DRB in the DRB information items which the target base station does not agree to establish into a DRB release list. The determination unit is configured to determine the DRB addition modification list and the DRB release list to be the first DRB configuration information.

Figure 8:
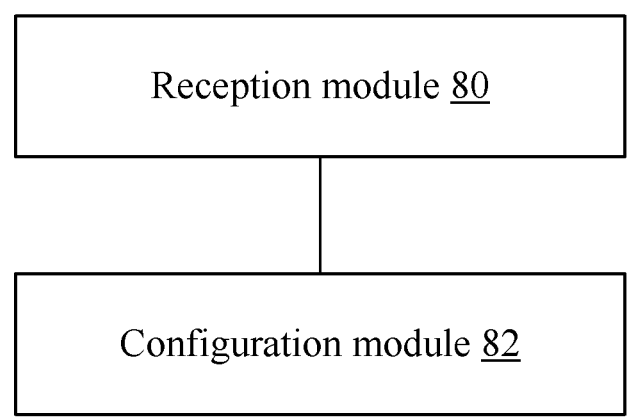
FIG. 8 is a block diagram of yet another handover apparatus according to an embodiment of the present disclosure.

FIG. 8 is a block diagram of a handover apparatus according to an embodiment of the present disclosure. The apparatus may be applied in a user equipment (UE). As shown in FIG. 8, the apparatus includes: a reception module 80 and a configuration module 82.

The reception module 80 is configured to receive a radio resource control (RRC) connection reconfiguration message carrying DRB configuration information transmitted by a source base station when the UE is being handed over from the source base station to a target base station. The DRB configuration information is generated by the target base station for the UE according to a handover request message. The handover request message is transmitted by the source base station to the target base station and carries one or more DRB information items configured by the source base station for the UE and one or more flow QoS information items configured by a core network side for the UE.

The configuration module 82 is configured to configure radio resources according to the DRB configuration information in the RRC connection reconfiguration message.

In an exemplary embodiment, the DRB configuration information of the target base station for the UE includes: a DRB addition modification list and a DRB release list. Each tuple in the DRB addition modification list includes a first DRB identifier and one or more of the following: one or more flow IDs or QoS IDs associated with a first DRB corresponding to the first DRB ID, packet data convergence protocol (PDCP) configuration information, radio link control (RLC) configuration information and logical channel configuration information, where the first DRB is a DRB in the DRB information items which the target base station agrees to establish.

Each tuple in the DRB release list includes a second DRB ID, where a second DRB corresponding to the second DRB ID is a DRB in the DRB information items which the target base station does not agree to establish.

The various modules described above may be implemented by software or hardware. In the implementation by hardware, the various modules are disposed in a same processor or respectively in processors in a manner that the various modules may be combined arbitrarily.

An embodiment of the present disclosure provides a handover method for an Xn interface to ensure the QoS. The method includes the steps described below.

A source base station transmits a handover request message to a target base station. The handover request message carries one or more DRB information items of a source base station at an access network side (i.e., the DRB information item configured by the source base station for the UE described in the above embodiment) and one or more flow QoS information items configured by a core network side for the UE.

The target base station receives the handover request message, agrees the handover request and generates first DRB configuration information according to information carried by the handover request message.

The target base station transmits a handover request acknowledgement message to the source base station. The handover request acknowledgement message carries the first DRB configuration information. The source base station receives the handover request acknowledgement message and transmits an RRC connection reconfiguration message to the UE. The RRC connection reconfiguration message carries DRB configuration information of the target base station. The UE receives the RRC connection reconfiguration message and performs the configuration according to the first DRB configuration information.

Figure 9:
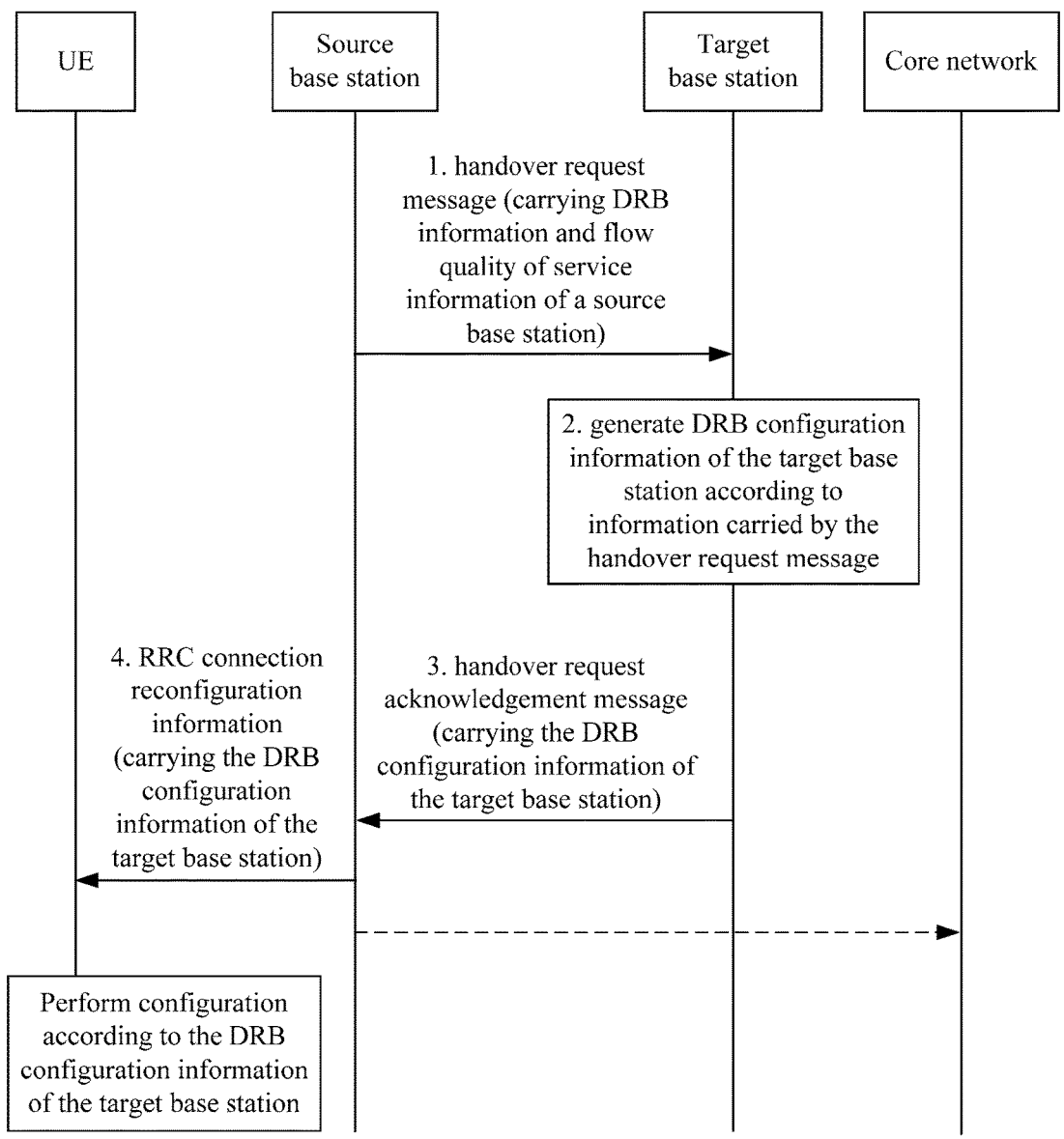
FIG. 9 is a flowchart of a handover method according to an embodiment of the present disclosure.

FIG. 9 is a flowchart of a handover method according to an embodiment of the present disclosure. In this embodiment, the target base station agrees to establish DRBs in all DRB information items, and the method includes steps described below.

In step 1, the source base station transmits a handover request message to the target base station. The handover request message carries one or more DRB information items of a source base station at an access network side and one or more flow QoS information items of a core network side.

In step 2, the target base station receives the handover request message, agrees the handover request, agrees to establish the DRBs in all DRB information items, and generates DRB configuration information of the target base station according to information carried by the handover request message. The DRB configuration information of the target base station includes a DRB addition modification list. Each term in the DRB addition modification list includes a DRB ID, one or more flow IDs or QoS IDs associated with a DRB corresponding to the DRB ID, and one or more of the following: PDCP configuration information, RLC configuration information and logical channel configuration information.

In step 3, the target base station transmits a handover request acknowledgement message to the source base station. The handover request acknowledgement message carries the DRB configuration information of the target base station and the DRB addition modification list (each term in the DRB addition modification list includes the DRB ID and one or more flow IDs or QoS IDs associated with the DRB corresponding to the DRB ID).

In step 4, the source base station receives the handover request acknowledgement message and transmits an RRC connection reconfiguration message to the UE. The RRC connection reconfiguration message carries DRB configuration information generated by the target base station for the UE.

In step 5, the UE receives the RRC connection reconfiguration message, and performs, according to the DRB corresponding to each term in the DRB addition modification list in the DRB configuration information, at least one of the following: reestablishing a PDCP, reestablishing a RLC, reconfiguring the PDCP according to the PDCP configuration information, reconfiguring the RLC according to the RLC configuration information, and reconfiguring a logical channel according to the logical channel configuration information.

An embodiment of the present disclosure provides a handover method. In this embodiment, a target base station agrees to establish a part of DRBs in information of multiple DRBs, and the method includes steps described below.

In step 1, the source base station transmits a handover request message to the target base station. The handover request message carries multiple DRB information items of a source base station at an access network side and one or more flow QoS information items of a core network side.

In step 2, the target base station receives the handover request message, agrees the handover request, agrees to establish a part of DRBs in information of multiple DRBs, and generates first DRB configuration information according to information carried by the handover request message. The first DRB configuration includes a DRB addition modification list and a DRB release list.

The target base station puts DRB configuration information corresponding to a first DRB in the DRB information items which the target base station agrees to establish into the DRB addition modification list, and puts a DRB identifier (DRB ID) corresponding to a second DRB in the DRB information items which the target base station does not agree to establish into the DRB release list.

The DRB addition modification list includes DRB configuration information corresponding to a first DRB in information of multiple DRBs which the target base station agrees to establish. Each DRB information item includes a first DRB ID, one or more flow IDs or QoS IDs associated with the DRB corresponding to the first DRB ID, and one or more of the following: PDCP configuration information, RLC configuration information and logical channel configuration information.

In step 3, the target base station transmits a handover request acknowledgement message to the source base station. The handover request acknowledgement message carries the first DRB configuration information, a first list of the DRBs which the target base station agrees to establish (i.e., the DRB addition modification list each term of which includes the first DRB ID and one or more flow IDs or QoS IDs associated with the DRB corresponding to the first DRB ID) and a second list of DRBs which the target base station does not agree to establish (i.e., the DRB release list each term of which includes a second DRB ID).

In step 4, the source base station receives the handover request acknowledgement message and transmits an RRC connection reconfiguration message to the UE. The RRC connection reconfiguration message carries the first DRB configuration information.

In step 5, the UE receives the RRC connection reconfiguration message, performs, according to a DRB corresponding to each term in the DRB addition modification list in the first DRB configuration information, at least one of the following: reestablishing a PDCP, reestablishing a RLC, reconfiguring the PDCP according to the PDCP configuration information, reconfiguring the RLC according to the RLC configuration information, and reconfiguring a logical channel according to the logical channel configuration information, and releases the DRBs corresponding to the DRB IDs in the DRB release list according to the DRB IDs in the DRB release list.

An embodiment of the present disclosure provides a handover method. In this embodiment, a target base station agrees to establish all DRBs in all DRB information items and changes an association relationship between a DRB and a Qos ID. The method includes steps described below.

In step 1, a source base station transmits a handover request message to the target base station. The handover request message carries one or more DRB information items of a source base station at an access network side and one or more flow QoS information items of a core network side.

In step 2, the target base station receives the handover request message, agrees the handover request, agrees to establish the DRBs in information of all DRBs, changes the association relationship between the DRB and the QoS ID (for example, the handover request message includes 2 DRBs, i.e., DRB 1 and DRB 2, where DRB 1 is associated with QoS ID 1 and QoS ID 2 and DRB 2 is associated with QoS ID 3 and QoS ID 4. After the association relationship is changed, DRB 1 is associated with QoS ID 2 and DRB 2 is associated with QoS ID 1, QoS ID 3 and QoS ID 4), generates first DRB configuration information according to information carrier by the handover request information and the changed association relationship between the DRB and the QoS ID, and puts the DRB configuration information corresponding to the DRB in the DRB information items which the target base station agrees to establish into a DRB addition modification list. The first DRB configuration information includes the DRB addition modification list. Each DRB configuration information in the DRB addition modification list includes a DRB ID, one or more QoS IDs associated with the DRB after the association relationship between the DRB and the QoS ID is changed, and one or more of the following: PDCP configuration information, RLC configuration information and logical channel configuration information.

In step 3, the target base station transmits a handover request acknowledgement message to the source base station. The handover request acknowledgement message carries the first DRB configuration information and the DRB addition modification list which the target base station agrees to establish (each term in the DRB addition modification list includes the DRB ID and one or more flow IDs or QoS IDs associated with the DRB corresponding to the DRB ID).

In step 4, the source base station receives the handover request acknowledgement message and transmits an RRC connection reconfiguration message to the UE. The RRC connection reconfiguration message carries the DRB configuration information of the target base station.

In step 5, the UE receives the RRC connection reconfiguration message, and performs, according to a DRB corresponding to each term in the DRB addition modification list in the DRB configuration information, at least one of the following: reestablishing a PDCP, reestablishing a RLC, reconfiguring the PDCP according to the PDCP configuration information, reconfiguring the RLC according to the RLC configuration information, and reconfiguring a logical channel according to the logical channel configuration information. In addition, the UE reconfigures the association relationship between the DRB and the QoS ID according to first DRB configuration information.

An embodiment of the present disclosure provides a handover method. In this embodiment, the target base station agrees to establish a part of DRBs in information of multiple DRBs and changes an association relationship between a DRB and a Qos ID. The method includes steps described below.

In step 1, a source base station transmits a handover request message to the target base station, where the handover request message carries multiple DRB information items of a source base station at an access network side and one or more flow QoS information items of a core network side.

In step 2, the target base station receives the handover request message, agrees the handover request, agrees to establish a part of DRBs in information of multiple DRBs, changes the association relationship between the DRB and the QoS ID (for example, the handover request message includes 3 DRBs, i.e., DRB 1, DRB 2 and DRB 3, where DRB 1 is associated with QoS ID 1 and QoS ID 2, DRB 2 is associated with QoS ID 3 and DRB 3 is associated with QoS ID 4 and QoS ID 5. The target base station agrees to establish merely DRB 1 and DRB 2. After the association relationship is changed, DRB 1 is associated with QoS ID 1 and QoS ID 2, DRB 2 is associated with the QoS ID 3 and QoS ID 5, DRB 3 is released and QoS ID 4 is not associated with any DRB), and generates first DRB configuration information according to information carried by the handover request information. The first DRB configuration information includes a DRB addition modification list and a DRB release list.

The target base station puts DRB configuration information corresponding to a first DRB in the DRB information items which the target base station agrees to establish into the DRB addition modification list, and puts a DRB identifier corresponding to a second DRB in the DRB information items which the target base station does not agree to establish into the DRB release list.

The DRB addition modification list includes DRB configuration information corresponding to a first DRB which the target base station agrees to establish in information of multiple DRBs. Each DRB information item includes a first DRB ID, one or more QoS IDs associated with the DRB corresponding to the first DRB ID after the association relationship is changed, and one or more of the following: PDCP configuration information, RLC configuration information and logical channel configuration information. The DRB release list includes the DRB IDs corresponding to the DRBs which the target base station does not agree to establish.

In step 3, the target base station transmits a handover request acknowledgement message to the source base station. The handover request acknowledgement message carries the first DRB configuration information, the DRB addition modification list of the DRBs which the target base station agrees to establish (each term in the DRB addition modification list includes the first DRB ID and one or more QoS IDs associated with the DRB corresponding to the first DRB ID), the DRB release list of the DRBs which the target base station does not agree to establish (each term in the DRB release list include a second DRB ID) and a QoS ID list including QoS IDs which are not associated with any of the DRBs in the information of multiple DRB s.

In step 4, the source base station receives the handover request acknowledgement message and transmits an RRC connection reconfiguration message to the UE, where the RRC connection reconfiguration message carries the DRB configuration information of the target base station.

In step 4a, the source base station sends the QoS ID list to a core network (the source base station may also operates the target base station to send the QoS ID list to the core network after the UE successively accesses to the target base station), so that the core network performs relevant response operations.

In step 5, the UE receives the RRC connection reconfiguration message, and performs, according to a DRB corresponding to each item in the DRB addition modification list in the DRB configuration information, at least one of the following: reestablishing a PDCP, reestablishing a RLC, reconfiguring the PDCP according to the PDCP configuration information, reconfiguring the RLC according to the RLC configuration information, and reconfiguring a logical channel according to the logical channel configuration information. The UE also reconfigures the association relationship between the DRB and the QoS ID according to first DRB configuration information. The UE release the DRBs corresponding to the DRB IDs according to DRB IDs in the DRB release list.

In the above embodiment, in the 5G system, when the core network and the access network adopt different QoS mechanisms and an evolved eNB and a 5G base station cannot identify each other's RRC protocol, the method described above may implement the handover capable of ensuring the QoS on an Xn interface between the evolved eNB and the 5G base station.

An embodiment of the present disclosure provides a storage medium which is configured to store program codes for executing the steps described below.

A handover request message is transmitted to a target base station, where the handover request message carries information of one or more DRB information items configured by a source base station for a UE and one or more flow QoS information items configured by a core network side for the UE.

A handover request acknowledgement message transmitted by the target base station is received, where the handover request acknowledgement message carries first DRB configuration information generated by the target base station for the UE according to the handover request message.

An RRC connection reconfiguration message carrying the first DRB configuration information is sent to the UE, with which the UE configures radio resources.

Optionally, in this embodiment, the storage medium may include a U disk, an ROM, an RAM, a mobile hard disk, a magnetic disk, an optical disk or another medium capable of storing program codes. Optionally, a processor in the source base station executes the following steps according to the program codes stored in the storage medium.

A handover request message is transmitted to the target base station, where the handover request message carries one or more DRB information items configured by the source base station for the UE and one or more flow QoS information items configured by the core network side for the UE.

The handover request acknowledgement message transmitted by the target base station is received, where the handover request acknowledgement message carries the first DRB configuration information generated by the target base station for the UE according to the handover request message.

The UE transmits the RRC connection reconfiguration message carrying the first DRB configuration information, and the UE configures radio resources by using the DRB configuration information.

One or more modules or one or more steps described above may be implemented by a general-purpose computing device. They may be concentrated on a single computing device or distributed on a network formed by multiple computing devices. Optionally, they may be implemented by program codes executable by the computing devices, so that they may be stored in a storage device and executable by the computing devices. In some circumstances, the illustrated or described steps may be executed in sequences different from those described herein, or the one or more modules or one or more steps may be made into various integrated circuit modules, or each module or step therein may be made into a single integrated circuit module.

Figure 10:
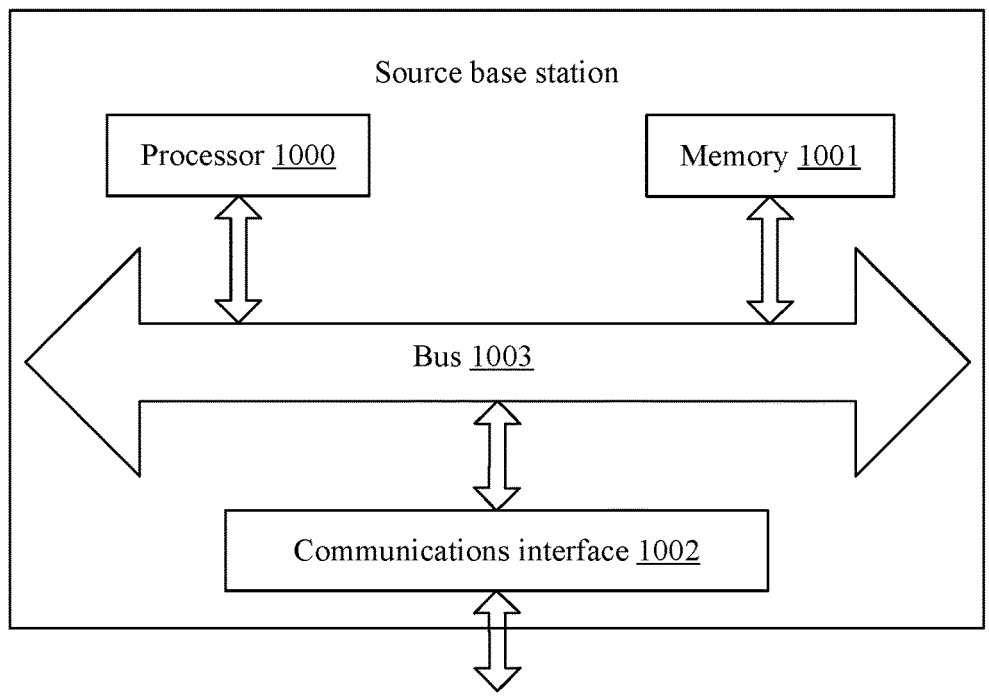
FIG. 10 is a schematic diagram illustrating a hardware structure of a source base station according to an embodiment of the present disclosure.

An embodiment provides a schematic diagram illustrating a hardware structure of a source base station. With reference to FIG. 10, the source base station includes:

at least one processor 1000 (FIG. 10 shows one processor 1000 by way of example) and a memory 1001. The source base station may further include a communications interface 1002 and a bus 1003. The processor 1000, the memory 1001 and the communications interface 1002 may communicate with each other via the bus 1003. The processor 1000 may use logic instructions in the memory 1001 to execute the method executed by the source base station in the above embodiments.

In addition, the logic instructions in the memory 1001 may be implemented in the form of a software function unit and, when sold or used as an independent product, may be stored in a computer-readable storage medium.

As a computer-readable storage medium, the memory 1001 may be used for storing software programs and computer-executable programs, such as program instructions or modules corresponding to the method executed by the source base station in the above embodiments. The processor 1000 runs the software programs, instructions or modules stored in the memory 1001 to execute function applications and data processing, that is, to implement the method executed by the source base station in the above embodiments.

The memory 1001 may include a program storage region and a data storage region. The program storage region may store an operating system and an application program required by at least one function, and the data storage region may store data created depending on use of a terminal device. In addition, the memory 1001 may include a high-speed random access memory, and may further include a non-volatile memory.

Figure 11:
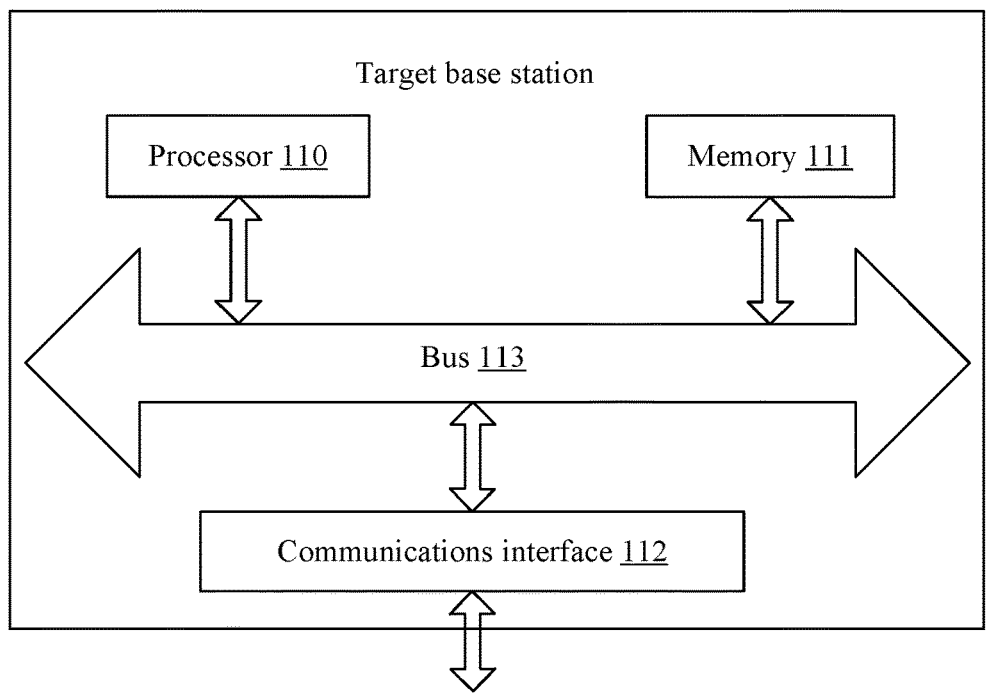
FIG. 11 is a schematic diagram illustrating a hardware structure of a target base station according to an embodiment of the present disclosure.

An embodiment provides a schematic diagram illustrating a hardware structure of a target base station. With reference to FIG. 11, the target base station includes:

at least one processor 110 (FIG. 11 shows one processor 110 by way of example) and a memory 111. The target base station may further include a communications interface 112 and a bus 113. The processor 110, the memory 111 and the communications interface 112 may communicate with each other via the bus 113. The processor 110 may call logic instructions in the memory 111 to execute the method executed by the target base station in the above embodiments.

In addition, the logic instructions in the memory 111 may be implemented in the form of a software function unit and, when sold or used as an independent product, may be stored in a computer-readable storage medium.

As a computer-readable storage medium, the memory 111 may be used for storing software programs and computer-executable programs, such as program instructions or modules corresponding to the method executed by the target base station in the above embodiments. The processor 110 runs the software programs, instructions or modules stored in the memory 111 to execute function applications and data processing, that is, to implement the method executed by the target base station in the above embodiments.

The memory 111 may include a program storage region and a data storage region. The program storage region may store an operating system and an application program required by at least one function; and the data storage region may store data created depending on use of a terminal device. In addition, the memory 111 may include a high-speed random access memory, and may further include a non-volatile memory.

Figure 12:
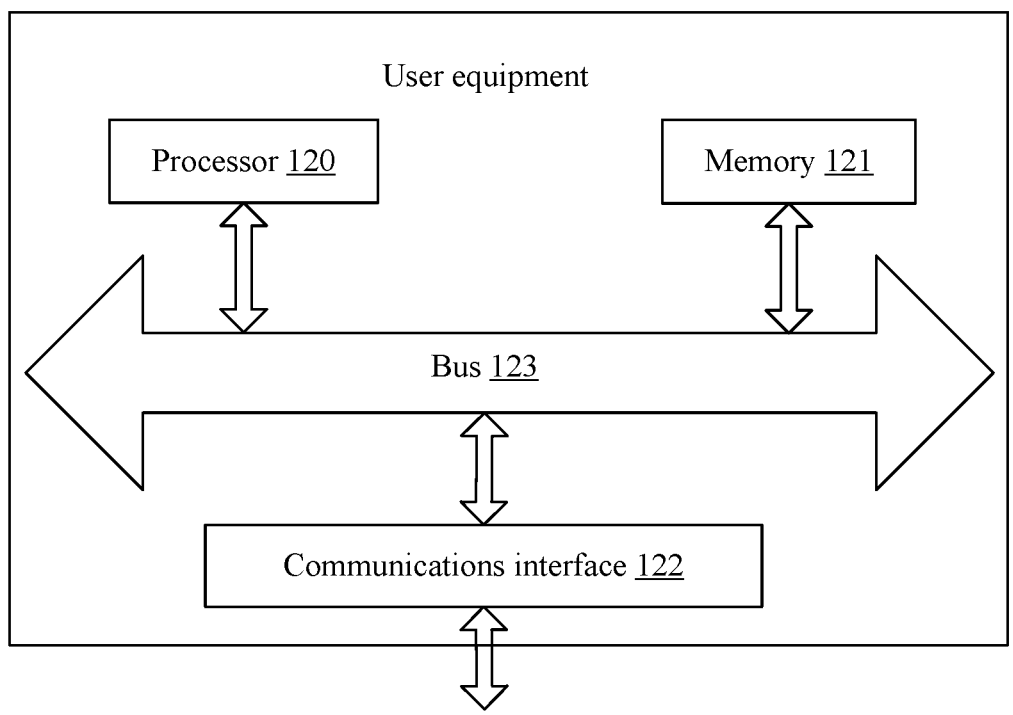
FIG. 12 is a schematic diagram illustrating a hardware structure of a user equipment according to an embodiment of the present disclosure.

An embodiment provides a schematic diagram illustrating a hardware structure of a user equipment. With reference to FIG. 12, the user equipment includes:

at least one processor 120 (FIG. 12 shows one processor 120 by way of example) and a memory 121. The user equipment may further include a communications interface 122 and a bus 123. The processor 120, the memory 121 and the communications interface 122 may communicate with each other via the bus 123. The processor 120 may call logic instructions in the memory 121 to execute the method executed by the user equipment in the above embodiments.

In addition, the logic instructions in the memory 121 may be implemented in the form of a software function unit and, when sold or used as an independent product, may be stored in a computer-readable storage medium.

As a computer-readable storage medium, the memory 121 may be used for storing software programs and computer-executable programs, such as program instructions or modules corresponding to the method executed by the user equipment (UE) in the above embodiments. The processor 120 runs the software programs, instructions or modules stored in the memory 121 to execute function applications and data processing, that is, to implement the method executed by the user equipment (UE) in the above embodiments.

The memory 121 may include a program storage region and a data storage region. The program storage region may store an operating system and an application program required by at least one function; and the data storage region may store data created depending on use of a terminal device. In addition, the memory 121 may include a high-speed random access memory, and may further include a non-volatile memory.

INDUSTRIAL APPLICABILITY

A handover method and apparatus may solve the problem that the QoS mechanism adopted by a core network and the QoS mechanism adopted by an access network are different when the base station is being handed over.

What is claimed is:
1. A handover method, comprising:
transmitting a handover request message by a source base station to a target base station, wherein the handover request message carries one or more data radio bearer (DRB) information items and one or more flow quality of service (QoS) information items,
wherein each DRB information item comprises a flow identifier (flow ID) and a DRB identifier (DRB ID) of a DRB associated with the flow ID,
wherein the flow ID indicates a flow QoS information item; and
receiving, by the source base station, a handover request acknowledgement message from the target base station, wherein the handover request acknowledgement message carries a DRB configuration information for a user equipment (UE) according to the handover request message.
2. The method according to claim 1, wherein each flow QoS information item comprises identifier information for indicating a flow QoS information item, wherein the identifier information comprises a flow ID.

3. The method according to claim 2, wherein each DRB information item comprises:
   a packet data convergence protocol (PDCP) configuration information, a radio link control (RLC) configuration information, and a logical channel configuration information.

4. The method according to claim 1, wherein each flow QoS information item comprises a QoS rule, wherein the QoS rule comprises a guaranteed flow bit rate, a maximum flow bit rate, a flow priority level (FPL), and a reflective QoS indication.

5. The method according to claim 1, further comprising:
   transmitting a radio resource control (RRC) connection reconfiguration message carrying the DRB configuration information by the source base station to the UE.

6. A handover method, comprising:
   receiving, by a target base station, a handover request message from a source base station, wherein the handover request message carries one or more data radio bearer (DRB) information items and one or more flow quality of service (QoS) information items,
      wherein each DRB information item comprises a flow identifier (flow ID) and a DRB identifier (DRB ID) of a DRB associated with the flow ID,
      wherein the flow ID indicates a flow QoS information item;
   generating a DRB configuration information by the target base station for a user equipment (UE) according to the handover request message.

7. The method according to claim 6, wherein each DRB configuration information comprises:
   a packet data convergence protocol (PDCP) configuration information, a radio link control (RLC) configuration information and a logical channel configuration information.

8. The method according to claim 6, further comprising:
   transmitting a handover request acknowledgement message carrying the DRB configuration information by the target base station to the source base station.

9. The method according to claim 6, wherein each flow QoS information item comprises identifier information for indicating a flow QoS information item, wherein the identifier information comprises a flow ID.

10. The method according to claim 6, wherein each flow QoS information item comprises a QoS rule, wherein the QoS rule comprises a guaranteed flow bit rate, a maximum flow bit rate, a flow priority level (FPL), and a reflective QoS indication.

11. A handover apparatus, applied to a source base station, comprising:
   a processor configured to:
   transmit a handover request message to a target base station, wherein the handover request message carries one or more DRB information items and one or more flow QoS information items,
      wherein each DRB information item comprises a flow identifier (flow ID) and a DRB identifier (DRB ID) of a DRB associated with the flow ID,
      wherein the flow ID indicates a flow QoS information item; and
   receive a handover request acknowledgement message from the target base station, wherein the handover request acknowledgement message carries a DRB configuration information for a user equipment (UE) according to the handover request message.

12. The apparatus according to claim 11, wherein each flow QoS information item comprises identifier information for indicating a flow QoS information item, wherein the identifier information comprises a flow ID.

13. The apparatus according to claim 11, wherein each flow QoS information item comprises a QoS rule, wherein the QoS rule comprises a guaranteed flow bit rate, a maximum flow bit rate, a flow priority level (FPL), and a reflective QoS indication.

14. The apparatus according to claim 12, wherein each DRB information item comprises:
   a packet data convergence protocol (PDCP) configuration information, a radio link control (RLC) configuration information, and a logical channel configuration information.

15. The apparatus according to claim 11, wherein the processor is further configured to:
   transmit a radio resource control (RRC) connection reconfiguration message carrying the DRB configuration information by the source base station to the UE.

16. A handover apparatus, applied to a target base station, comprising:
   a processor configured to:
   receive a handover request message from a source base station, wherein the handover request message carries one or more data radio bearer (DRB) information items and one or more flow quality of service (QoS) information items,
      wherein each DRB information item comprises a flow identifier (flow ID) and a DRB identifier (DRB ID) of a DRB associated with the flow ID,
      wherein the flow ID indicates a flow QoS information item;
   generate a DRB configuration information for a user equipment (UE) according to the handover request message.

17. The apparatus according to claim 16, wherein the DRB configuration information comprises:
   a packet data convergence protocol (PDCP) configuration information, a radio link control (RLC) configuration information and a logical channel configuration information.

18. The apparatus according to claim 16, wherein the processor is further configured to:
   transmit a handover request acknowledgement message carrying the DRB configuration information by the target base station to the source base station.

19. The apparatus according to claim 16, wherein each flow QoS information item comprises identifier information for indicating a flow QoS information item, wherein the identifier information comprises a flow ID.

20. The apparatus according to claim 16, wherein each flow QoS information item comprises a QoS rule, wherein the QoS rule comprises a guaranteed flow bit rate, a maximum flow bit rate, a flow priority level (FPL), and a reflective QoS indication.

* * * * *